US010239460B2

(12) United States Patent
Hotio

(10) Patent No.: US 10,239,460 B2
(45) Date of Patent: Mar. 26, 2019

(54) AUTOMOBILE STORAGE CONTAINER ASSEMBLY

(71) Applicant: Angeline Hotio, Washington, DC (US)

(72) Inventor: Angeline Hotio, Washington, DC (US)

( * ) Notice: Subject to any disclaimer, the term of this patent is extended or adjusted under 35 U.S.C. 154(b) by 0 days.

(21) Appl. No.: 15/227,595

(22) Filed: Aug. 3, 2016

(65) Prior Publication Data

US 2017/0036610 A1    Feb. 9, 2017

Related U.S. Application Data

(60) Provisional application No. 62/200,397, filed on Aug. 3, 2015.

(51) Int. Cl.
*B60R 7/04* (2006.01)

(52) U.S. Cl.
CPC .................................. *B60R 7/043* (2013.01)

(58) Field of Classification Search
CPC ........... B60R 7/043; B60R 7/14; B60N 3/103; B60N 3/08
USPC ......................................................... 224/275
See application file for complete search history.

(56) References Cited

U.S. PATENT DOCUMENTS

| | | | | |
|---|---|---|---|---|
| 621,627 A * | 3/1899 | White | ................ | B61D 27/0081 416/122 |
| 4,499,599 A * | 2/1985 | Polett | ................ | B65D 88/1687 383/20 |
| 5,044,321 A * | 9/1991 | Selph | ................... | A01K 1/0272 119/416 |
| 5,226,576 A * | 7/1993 | Ellsworth | ............... | B60R 7/043 224/275 |
| 5,868,294 A * | 2/1999 | Webster | ................... | B60R 7/043 224/275 |
| 5,997,081 A * | 12/1999 | Kayumi | ................... | B60N 3/08 297/188.14 |
| 6,092,705 A * | 7/2000 | Meritt | ..................... | B60R 11/02 224/275 |
| 6,097,448 A * | 8/2000 | Perkins | ............... | B60R 11/0229 224/275 |
| 6,105,839 A * | 8/2000 | Bell | ....................... | B60N 3/004 224/275 |
| 6,216,927 B1 * | 4/2001 | Meritt | ..................... | B60R 11/02 224/275 |
| 6,405,909 B1 * | 6/2002 | Burnett | ................... | B60R 7/043 211/64 |
| D473,510 S * | 4/2003 | Denmeade | ................... | D12/416 |

(Continued)

FOREIGN PATENT DOCUMENTS

DE      202013010958 U1 *  4/2014  ............. B60R 7/043
JP    WO 2005074674 A1 *  8/2005  ........... A01K 1/0254

*Primary Examiner* — Nathan J Newhouse
*Assistant Examiner* — Lester L Vanterpool

(57) ABSTRACT

An automobile storage container assembly. The automobile storage container assembly includes a first compartment and second compartment each having a base, a plurality of sidewalls extending therefrom, and an open upper end defining an interior volume. The first container includes a first strap and a second strap connected to first and second sidewalls, and each of the first and second straps are securable to the innermost post of an automobile seat headrest. The second compartment includes third and fourth straps that are securable to the outermost posts of an automobile headrest. The first and second compartments are positioned in a stacked configuration between the seats of the vehicle.

12 Claims, 2 Drawing Sheets

(56) References Cited

U.S. PATENT DOCUMENTS

| | | | | |
|---|---|---|---|---|
| 6,626,337 B1* | 9/2003 | Cox | | B60N 3/08 |
| | | | | 224/275 |
| 6,651,941 B1* | 11/2003 | Kinsel | | A45F 5/1026 |
| | | | | 248/100 |
| 6,685,016 B2* | 2/2004 | Swaim | | A45C 7/0095 |
| | | | | 206/320 |
| 6,928,654 B2* | 8/2005 | Tranchina | | G06F 3/1423 |
| | | | | 348/837 |
| 6,975,806 B1* | 12/2005 | Lavelle | | B60R 11/02 |
| | | | | 348/E5.128 |
| 6,986,447 B2* | 1/2006 | Truong | | B60R 11/0229 |
| | | | | 224/275 |
| 7,360,649 B2* | 4/2008 | Swaim | | A45C 7/0095 |
| | | | | 206/320 |
| 7,870,983 B2* | 1/2011 | Chen | | B60R 11/00 |
| | | | | 224/275 |
| 8,961,013 B2* | 2/2015 | Bush | | A45C 3/04 |
| | | | | 190/107 |
| 9,303,353 B2* | 4/2016 | Audet | | D06F 95/002 |
| 2004/0112931 A1* | 6/2004 | Swaim | | A45C 7/0095 |
| | | | | 224/585 |
| 2004/0245301 A1* | 12/2004 | Truong | | B60R 11/0229 |
| | | | | 224/275 |
| 2005/0103815 A1* | 5/2005 | Lee | | B60K 35/00 |
| | | | | 224/275 |
| 2008/0128422 A1* | 6/2008 | Adler | | B60R 7/043 |
| | | | | 220/495.06 |
| 2008/0231063 A1* | 9/2008 | Bowers | | A45F 5/02 |
| | | | | 296/1.07 |
| 2013/0062357 A1* | 3/2013 | Souza | | D06F 95/002 |
| | | | | 220/676 |
| 2013/0257114 A1* | 10/2013 | Lee | | B60R 7/043 |
| | | | | 297/188.04 |
| 2014/0246346 A1* | 9/2014 | Franco | | B60R 7/043 |
| | | | | 206/335 |
| 2015/0144671 A1* | 5/2015 | Seifert | | B60R 7/005 |
| | | | | 224/539 |
| 2017/0015252 A1* | 1/2017 | Tchetgen | | B60N 2/80 |

* cited by examiner

AUTOMOBILE STORAGE CONTAINER ASSEMBLY

CROSS REFERENCE TO RELATED APPLICATIONS

This application claims the benefit of U.S. Provisional Application No. 62/200,397 filed on Aug. 3, 2015. The above identified patent application is herein incorporated by reference in its entirety to provide continuity of disclosure.

FIELD OF THE INVENTION

The present invention relates to container assemblies. More specifically, the present invention relates to an automobile service container assembly for storing articles between the front seats of an automobile.

BACKGROUND OF THE INVENTION

It is often necessary to spend extended periods of time traveling in an automobile. For example, many individuals travel long distances for vacation, or commute to and from work on a daily basis. It can be difficult to store and organize food, beverages, and other essential items in a vehicle, since vehicles often do not have an adequate amount of storage space. Individuals often resort to storing items all over the interior of the vehicle, such as on the floor, or on the seats. This can cause the vehicle to become disorganized and messy. Food, beverages, and garbage can build up over time, leading to an unsightly appearance. It is therefore desirable to provide a storage container for use in a vehicle that enables users to store articles such as food, beverages, and other articles.

Devices have been disclosed in the prior art that relate to automobile storage containers. These include devices that have been patented and published in patent application publications. These devices generally relate to single storage containers, such as U.S. Published Patent Application Number 2008/0231063, U.S. Pat. Nos. 5,868,294, 5,044,321, 6,097,448, 5,226,576, and U.S. Published Patent Application Number 2008/0128422.

These prior art devices have several known drawbacks. These devices fail to provide multiple compartments for storing larger amounts of items. Additionally, the prior art devices are not configured to be secured between the front seats of vehicle, whereby the containers are accessible by all vehicle passengers simultaneously. The prior art devices further fail to provide storage devices securable to the headrest portion of a car seat.

In light of the devices disclosed in the prior art, it is submitted that the present invention substantially diverges in design elements from the prior art and consequently it is clear that there is a need in the art for an improvement to existing automobile storage containers. In this regard the instant invention fulfills these needs.

SUMMARY OF THE INVENTION

In view of the foregoing disadvantages inherent in the known types of automobile storage containers now present in the prior art, the present invention provides an automobile storage container assembly wherein the same can be utilized for providing convenience for the user when storing items in an automobile. The automobile storage assembly includes a first compartment and second compartment each having a base, a plurality of sidewalls extending therefrom, and an open upper end defining an interior volume. The first container includes a first strap and a second strap connected to first and second sidewalls, and each of the first and second straps are securable to the innermost post of an automobile seat headrest. The second compartment includes third and fourth straps that are securable to the outermost posts of an automobile headrest. The first and second compartments are positioned in a stacked configuration between the seats of the vehicle.

One object of the present invention is to provide an automobile storage container assembly having all of the advantages of prior art storage containers with none of the disadvantages.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
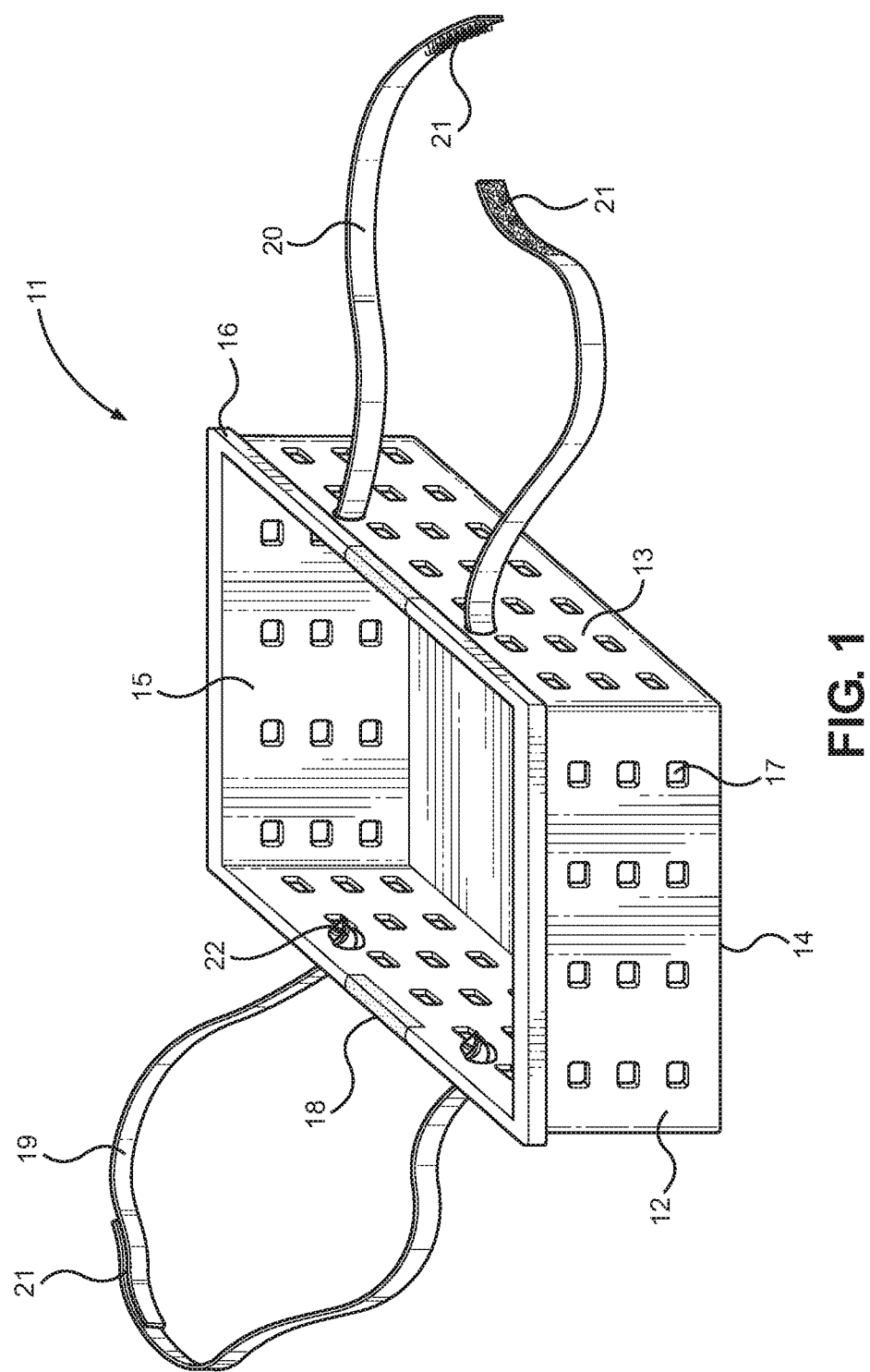
FIG. 1 shows a perspective view of one of the compartments of an automobile storage container assembly according to the present invention.

Reference is made herein to the attached drawings. Like reference numerals are used throughout the drawings to depict like or similar elements of the automobile storage container assembly. For the purposes of presenting a brief and clear description of the present invention, the preferred embodiment will be discussed as used for storing articles in an automobile storage container assembly. The figures are intended for representative purposes only and should not be considered to be limiting in any respect.

Referring now to FIG. 1, there is shown a perspective view of one of the compartments of an automobile storage container assembly according to the present invention. The automobile storage container assembly includes at least a first compartment 12; however, multiple compartments 12 are preferably utilized. The compartment 12 generally comprises a base 14 and a plurality of sidewalls 13 extending therefrom, defining an interior volume 15. The interior volume has an open upper end. In an alternate embodiment of the invention, the upper end is closed via a lid or a closure such as a zipper disposed on upper ends of the sidewalls 15.

In the illustrated embodiment, a flange 16 is disposed on the uppermost portion of the sidewalls 13. The flange 16 is configured to support an additional compartment 12 thereon, allowing the automobile storage container assembly 11 to maintain a stacked configuration with respect to the individual compartments 12. A handle 18 is disposed on the flange 16 in order to facilitate easy transportation of each individual compartment 12. The handle may include a non-slip grip thereon. One embodiment of the invention includes rigid sidewalls 13 having a plurality of apertures 17 thereon for reduction of weight. The rigid sidewalls 13 are formed from a rigid material such as plastic or metal. Other embodiments of the invention include pliable sidewalls 13 made from a fabric material.

The compartment 12 further comprises a first strap 19 and a second strap 20, each of which are connected to the sidewalls 13. The first strap 19 and second strap 20 are positioned on opposite sidewalls 13. Each of the straps 19, 20 form a loop configuration and comprise a fastener 21 thereon. In the illustrated embodiment, the fastener 21 is shown as a hook and loop fastener. However, other suitable fasteners may be utilized, such as snaps, buckles, clips, or the like. In the illustrated embodiment, the straps 19, 20 are secured to the sidewall via a knot 22 that is sized so as not to pass through the aperture 17.

Figure 2:
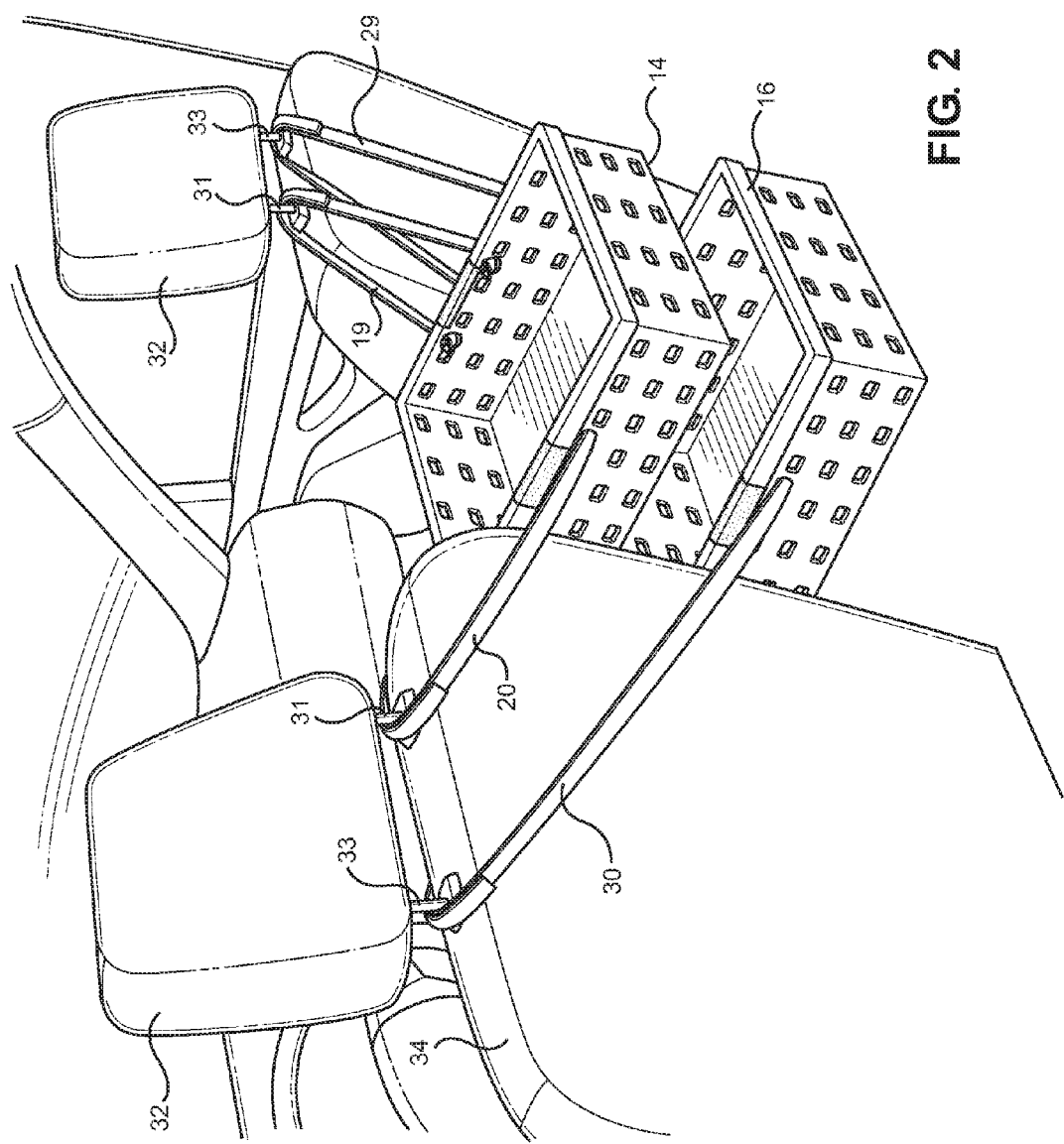
FIG. 2 shows a perspective view of an automobile storage container assembly according to the present invention secured between the front seats of a vehicle.

Referring now to FIG. 2, there is shown a perspective view of an automobile storage container assembly according to the present invention secured between the front seats of a vehicle. The automobile storage container assembly is positionable between the front seats 34 of a vehicle. In order to maintain a stacked configuration, a first compartment includes a first strap 20 and second strap 19 that are each secured to the innermost post 31 of a headrest 32 of the vehicle seat 34.

The automobile storage container assembly further includes additional compartments that may be secured between the vehicle seats 34. A second compartment includes a third strap 29 and fourth strap 30. The third and fourth straps 29, 30 are securable to the outermost post 33 of the headrest 32. The third strap 29 and fourth strap 30 are longer than the first strap 20 and second strap 19, allowing the second compartment to be positioned beneath the first compartment in a stacked configuration. In the illustrated embodiment, a space separates the first and second compartments. In alternate embodiments, the base 14 of the first compartment contacts the flange 16 of the second compartment and is supported thereon. When not in use, the individual compartments may be disconnected from the headrest posts 31, 33 and stored on or under the vehicle seat 34.

The automobile storage container assembly can vary in its construction. For example, each container may be constructed of leather, solid plastic, silicone, or other suitable materials, and different colors or patterns may be applied to the exterior surface thereof. The storage containers are preferably washable. Additionally, the dimensions of each container, including the depth of the interior and the shape of the perimeter, may vary during manufacture. Additional means of securing the compartments between the vehicle seats may include magnetic fasteners or slide rollers disposed on the seats that support the container assembly thereon, where they can be secured via snap closures or the like. Additionally, the automobile storage container assembly may be integrated into a vehicle or may be an accessory for use with multiple different vehicles. For the accessory, it is desirable that the straps are adjustable in length so that the individual compartments may be positioned at a desired height in accordance with the size of the vehicle and the preferences of the user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automobile storage container assembly, comprising:
   a first compartment having a planar base, a plurality of sidewalls extending therefrom, and an open upper end defining an interior volume;
   a first flange disposed about the open upper end of the first compartment, the first flange including a planar upper surface and a first pair of handles integrally formed therewith, the first pair of handles including a non-slip grip material;
   a first strap connected to a first sidewall of the plurality of sidewalls such that one of the handles of the first pair of handles is disposed between opposing ends of the first strap, the first strap forming a loop;
   a second strap connected to a second sidewall of the plurality of sidewalls such that one of the handles of the first pair of handles is disposed between opposing ends of the second strap, the second strap forming a loop, wherein the second sidewall is opposite the first sidewall;
   wherein each of the first strap and second strap comprise a fastener thereon;
   wherein each of the first strap and second strap fasteners are configured to secure each of the first and second straps to an innermost post of an automobile seat headrest;
   a second compartment having a planar base, a plurality of sidewalls extending therefrom, and an open upper end defining an interior volume;
   a second flange disposed about the open upper end of the second compartment, the second flange including a planar upper surface and a second pair of handles integrally formed therewith, the second pair of handles including a non-slip grip material;
   a third strap connected to a third sidewall of the plurality of sidewalls such that one of the handles of the second pair of handles is disposed between opposing ends of the third strap, the third strap forming a loop;
   a fourth strap connected to a fourth sidewall of the plurality of sidewalls such that one of the handles of the second pair of handles is disposed between opposing ends of the fourth strap, the fourth strap forming a loop, wherein the third sidewall is opposite the fourth sidewall;
   wherein each of the third and fourth straps comprise a fastener thereon;
   wherein each of the third and fourth strap fasteners are configured to secure each of the third and fourth straps to an outermost post of the automobile headrest; and
   wherein the first strap and the second strap each includes a length less than a length of the third strap and the fourth strap, such that the first strap, the second strap, the third strap, and the fourth strap are configured to position the second compartment below the first compartment in a stacked configuration wherein a gap is defined between the first compartment and the second compartment.

2. The automobile storage container assembly of claim 1, wherein the first strap and second straps comprise hook and loop material.

3. The automobile storage container assembly of claim 1, wherein the third strap and fourth strap comprise hook and loop material.

4. The automobile storage container assembly of claim 1, wherein each of the first container and second container comprises a plurality of apertures on the sidewalls thereof.

5. The automobile storage container assembly of claim 1, wherein the length of the each of the first strap, second strap, third strap, and fourth strap is adjustable.

6. The automobile storage container assembly of claim 1, wherein the fastener is a buckle.

7. The automobile storage container assembly of claim 1, wherein each of the first container and second container are composed of plastic.

8. The automobile storage container assembly of claim 1, wherein each of the first container and second container are composed of leather.

9. The automobile storage container assembly of claim 1, wherein each of the first container and second container are composed of fabric.

10. The automobile storage container of claim 1, wherein the first strap, the second strap, the third strap and the fourth strap are flexible.

11. The automobile storage container of claim 1, wherein the first fasteners and the second fasteners are disposed equidistantly between the first straps and the second straps and the third straps and fourth straps, respectively.

12. The automobile storage container of claim 4, wherein the plurality of apertures is disposed in a grid formation upon each of the sidewalls of the first container and the sidewalls of the second container.

* * * * *